(12) United States Patent
Kumar

(10) Patent No.: US 9,883,279 B2
(45) Date of Patent: Jan. 30, 2018

(54) WIRELESS HEADSET SYSTEM

(71) Applicant: Khyber Technologies Corporation, Akron, OH (US)

(72) Inventor: Rajendra Kumar, Akron, OH (US)

(73) Assignee: Khyber Technologies Corporation, Akron, OH (US)

( * ) Notice: Subject to any disclaimer, the term of this patent is extended or adjusted under 35 U.S.C. 154(b) by 60 days.

(21) Appl. No.: 14/814,190

(22) Filed: Jul. 30, 2015

(65) Prior Publication Data

US 2016/0037249 A1    Feb. 4, 2016

Related U.S. Application Data

(60) Provisional application No. 61/999,621, filed on Jul. 31, 2014, provisional application No. 62/152,850, filed on Apr. 25, 2015.

(51) Int. Cl.
| | |
|---|---|
| *H04R 1/10* | (2006.01) |
| *H04M 1/02* | (2006.01) |
| *H04M 1/05* | (2006.01) |
| *H04M 1/60* | (2006.01) |

(52) U.S. Cl.
CPC .......... *H04R 1/105* (2013.01); *H04M 1/0258* (2013.01); *H04M 1/05* (2013.01); *H04M 1/6066* (2013.01); *H04R 1/1016* (2013.01); *H04R 2201/107* (2013.01); *H04R 2420/07* (2013.01); *H04R 2420/09* (2013.01)

(58) Field of Classification Search
CPC   H04R 1/105; H04R 2201/107; H04R 1/1016; H04R 2420/07; H04R 2420/09; H04M 1/0258; H04M 1/05; H04M 1/6066
See application file for complete search history.

(56) References Cited

U.S. PATENT DOCUMENTS

| 5,590,417 A | * | 12/1996 | Rydbeck | H04M 1/0258 |
| | | | | 379/428.02 |
| 5,943,627 A | * | 8/1999 | Kim | H04B 1/385 |
| | | | | 379/426 |
| 7,979,035 B2 | * | 7/2011 | Griffin | H04B 1/3877 |
| | | | | 455/569.1 |
| 8,498,679 B2 | * | 7/2013 | Yu | H04M 1/0258 |
| | | | | 379/430 |

(Continued)

FOREIGN PATENT DOCUMENTS

| FR | 2600951 | * | 7/1986 | ............... B60J 1/02 |
| WO | WO 0062431 A1 | * | 10/2000 | ........... H04B 1/3838 |
| WO | WO02067553 | * | 8/2002 | ............... H04B 1/38 |

*Primary Examiner* — Davetta W Goins
*Assistant Examiner* — Oyesola C Ojo
(74) *Attorney, Agent, or Firm* — Black, McCuskey, Souers & Arbaugh, LPA

(57) ABSTRACT

A wireless headset system includes a housing having at least a wireless communication component configured to communicate with a wireless host device. The housing includes: a body portion, an ear-bud portion having at least a speaker operatively coupled with the wireless communications component, and a neck portion having an ear-bud end and a body end, the ear-bud end coupled with the ear-bud portion, the body end coupled with the body portion. The housing is attachable on the wireless host device between an inner surface of the ear-bud portion and an inner surface of the body portion.

20 Claims, 6 Drawing Sheets

(56) References Cited

U.S. PATENT DOCUMENTS

| | | | | |
|---|---|---|---|---|
| 2004/0185919 A1* | 9/2004 | Yoo | .................... | H04M 1/0258 455/575.1 |
| 2005/0107131 A1* | 5/2005 | Abramov | ............ | H04M 1/0258 455/569.1 |
| 2005/0130593 A1* | 6/2005 | Michalak | ............... | G08B 21/24 455/66.1 |
| 2005/0148363 A1* | 7/2005 | Kiessling | ............ | H04M 1/6066 455/556.1 |
| 2009/0197649 A1* | 8/2009 | Ranney | ............... | H04M 1/0258 455/569.1 |
| 2009/0325649 A1* | 12/2009 | Shi | ....................... | H04R 1/1066 455/569.1 |
| 2012/0224710 A1* | 9/2012 | Terlizzi | .............. | H01R 13/2428 381/74 |
| 2013/0244734 A1* | 9/2013 | Latham | ............... | H04M 1/0258 455/569.1 |
| 2015/0156531 A1* | 6/2015 | Atsmon | ............. | G06Q 10/0637 725/34 |

* cited by examiner

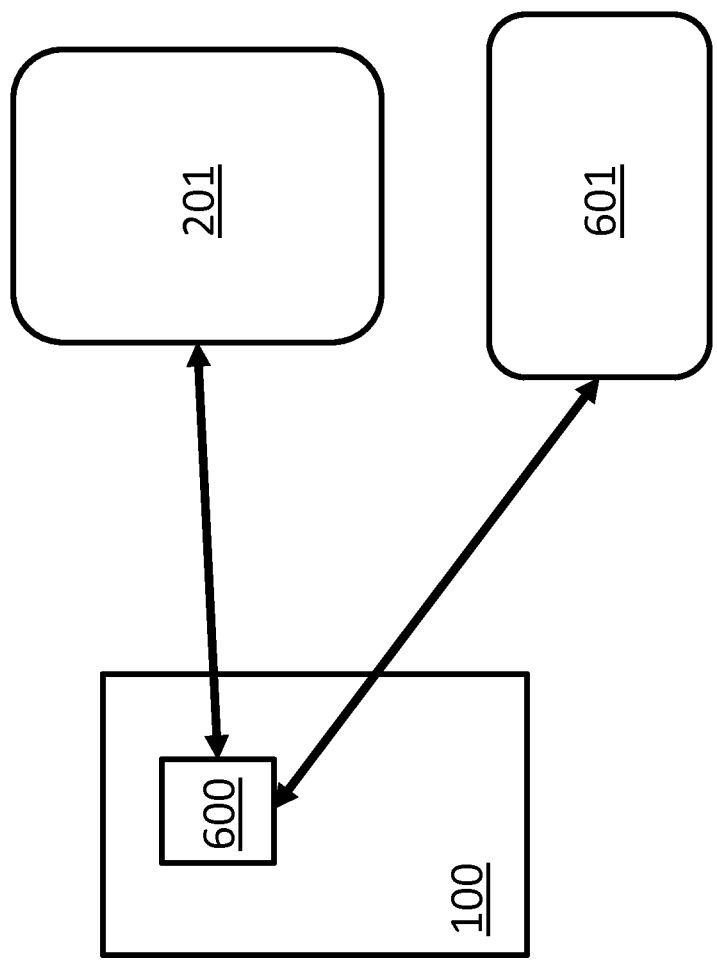

WIRELESS HEADSET SYSTEM

CROSS-REFERENCE TO RELATED APPLICATIONS

This U.S. patent application claims priority to provisional U.S. patent application Ser. No. 61/999,621 filed on Jul. 31, 2014 and provisional U.S. patent application Ser. No. 62/152,850 filed on Apr. 25, 2015, both of which are incorporated herein by reference in their entirety.

BACKGROUND

Technical Field

The subject matter disclosed herein relates to the field of wireless headsets.

Discussion of Art

Wireless headsets are used to increase the convenience of mobile devices by leveraging functionality without requiring the user to directly access and handle the mobile devices. This keeps the user's hands free for other tasks and avoids the chore of having to look for a mobile device in a purse, vehicle compartment, pocket, et cetera. Wireless headsets are not used exclusively for mobile phone calls, but can also be used with multimedia and other functional or entertainment content. Headsets not only increase convenience for the user, but also benefit people around the user, who might be disrupted by audio from a speaker held away from the user.

BRIEF DESCRIPTION

In accordance with the present innovations, there is provided a wireless headset system for a wireless host device. The wireless headset system includes a housing having at least a wireless communication component configured to communicate with a wireless host device. The housing includes: a body portion, an ear-bud portion having at least a speaker operatively coupled with the wireless communications component, and a neck portion having an ear-bud end and a body end, the ear-bud end coupled with the ear-bud portion, the body end coupled with the body portion, the neck portion separating the ear-bud portion and the body portion by a distance. The housing is attachable on the wireless host device between an inner surface of the ear-bud portion and an inner surface of the body portion, and where the body portion and the ear-bud portion are positionable to vary the distance between the body portion and the ear-bud portion.

BRIEF DESCRIPTION OF THE DRAWINGS

Reference is made to the accompanying drawings in which particular embodiments of the invention are illustrated as described in more detail in the description below, in which:

FIG. 6 illustrates wireless communications between the wireless headset device, the wireless host device, and a second host device.

DETAILED DESCRIPTION

Figure 1:
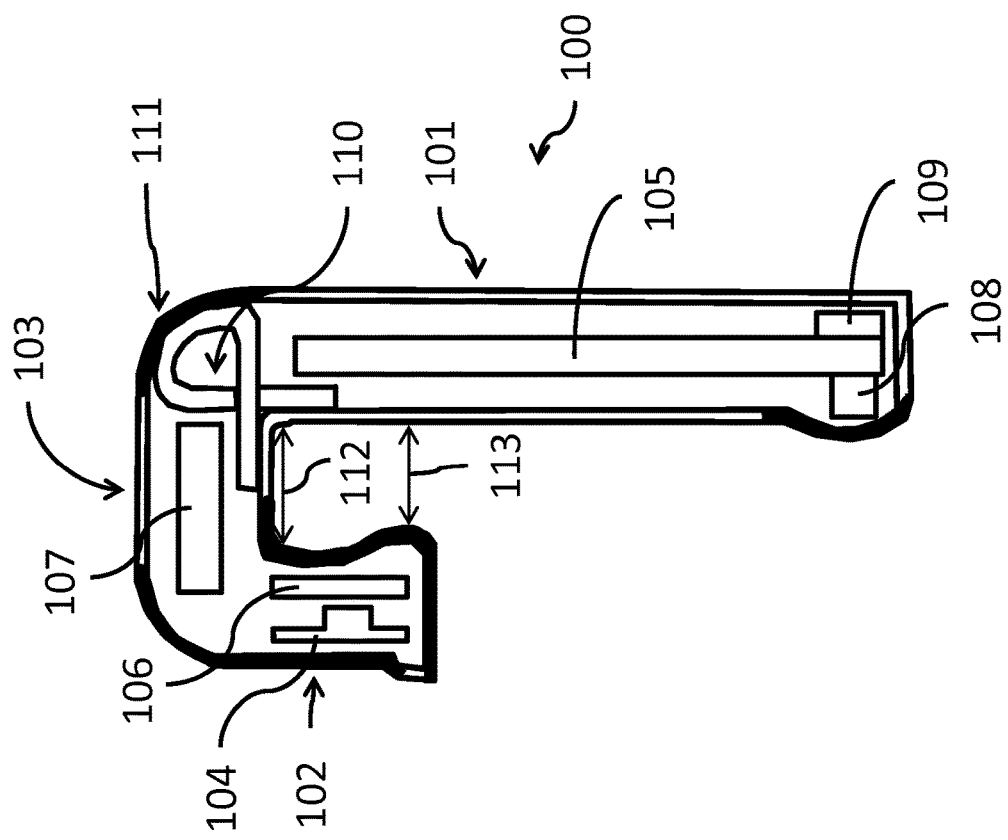
FIG. 1 is a cross-section view of an embodiment of the wireless headset device.

An example of a concern before users of conventional wireless headsets is the difficulty in finding the headset when needed, as they sometimes get lost when stowed apart from the phone. The size of traditional wireless headsets also makes them easy to misplace. The innovations disclosed herein therefore provide solutions for managing and maintaining wireless headsets when not in use.

Embodiments of the invention relate to a wireless headset system for a wireless host device. The wireless headset comprises a housing which includes a body portion, an ear-bud portion, and a neck portion which connects the body portion and ear-bud portion. The neck portion can be curved or straight. The shape of the housing allows the wireless headset to be attached to a wireless host device for convenient storage.

The housing can have at least a wireless communications component configured to communicate with the associated wireless host device. The ear-bud portion comprises a speaker operatively coupled with the wireless communications component. While in use, the ear-bud portion is able to be inserted into the user's ear. The body portion can have a microphone component which is operatively coupled with the wireless communications component. The body portion can terminate as an electronic connector such as a USB connector, among others. Said electronic connector is coupled to a battery within the housing and is able to charge the battery via an outside power source such as a wall charging unit, computer port, or other electrical connector.

The term "housing" refers to a casing that encloses and protects the internal components of a wireless headset, and generally defines the overall shape and structure of the headset at large. The housing has an ear-bud portion, a body portion, and a neck portion, and can include other elements in embodiments. The housing may be constructed of one or more materials and is attachable on the wireless host device.

The term "wireless communications component" refers to a component that is configured to perform at least one of transmitting or receiving data with at least a wireless host device. The wireless communication component can communicate via any wireless communication protocol such as Bluetooth, WiFi, Zigbee, among others.

As used herein, a "headset" refers to any system or device configured to be worn on a user's head. A headset can be a subcomponent of another system not entirely worn by the user or not worn in whole or part on a user's head. While this application is directed to headsets, such terminology is intended to convey the spirit of innovative aspects herein which may be equally applicable to other small components such as wearable devices on a user's collar, sleeve, wrist, or other body part, or a device having an optional stylus or other pointing device.

As used herein, an "ear-bud" refers to any system, device, or component configured to produce sound and be at least partially insertable into a user's ear canal or similarly attachable thereabout. While "ear-bud" is frequently recited in this disclosure, such terminology is intended to convey the spirit of innovative aspects herein which may be equally applicable to other small components and means for attaching non-ear-canal wearables such as clips, rings, hooks, headbands, adhesives, et cetera.

As used herein, "flexible" is defined as being capable of bending without breaking "Flexible" may be used to describe a component that can bend in at least one of an inward direction and an outward direction.

As used herein, "positionable" describes a component or device that can be temporarily flexed, compressed, or otherwise manipulated. The component or device then returns to a default "holding" position which provides enough force or friction to maintain the component or device's position on another object without external forces applied. "Compressible" as used herein refers to a component or material which is able to be condensed with applied pressure. A "compressible" material can re-expand and provide a force which can provide a seal, increase friction, or clasp an item positioned in between compressible materials. "Stretchable" as used herein refers to a component or material which is able to be drawn out or expanded along the component or a dimension thereof by an applied force or forces without the component or material breaking. The "stretchable" material can return to its original default shape and length once the stretching force is removed.

As used herein, "display" refers to any electronic device for the visual presentation of data which can include images, videos, et cetera. A "display" may include any wearable display such as an over-eye display, a display integrated into eyeglasses or eyeglass frames, or a contact lens display among others.

As illustrated in FIGS. 1-6, a wireless headset device 100 includes a housing. The housing includes at least a wireless communications component 600 configured to communicate with a wireless host device 201. The housing comprises three major portions: a body portion 101, an ear-bud portion 102, and a neck portion 103. The ear-bud portion 102 comprises at least a speaker 104 operatively coupled with the wireless communications component 600. The neck portion 103 has an ear-bud end and a body end. The ear-bud end of the neck portion 103 is coupled with the ear-bud portion 102 at an end of the ear-bud portion 102, this end hereinafter referred to as the "top" of the ear-bud portion 102, and the body end of the neck portion 103 is coupled with the body portion 101. The wireless headset device 100 can also include body portion components 105, ear-bud portion components 106, and neck portion components 107, wherein any of these component groups can include the wireless communication component 600, a printed circuit board ("PCB"), a battery, an indicator light, a multifunction button, or other electrical, electronic, or mechanical functional and/or aesthetic components. The body portion 101 can include a microphone component 108 which is operatively coupled with the wireless communications component 600. The body portion 101 may also comprise at least one of a display, a camera, and/or other components. Further, the body portion 101 can terminate as an electronic connector 109 such as a USB connector or port. This electronic connector 109 is operatively coupled to the battery and functions to charge the battery from an outside source such as a wall charging unit, computer port, or other electrical adapter. In alternative or complementary embodiments, charging adapters can be located at other locations on or in electronic connector 109. In at least one embodiment, device 100 is configured to mate with a port of wireless host device 201 when connected to facilitate not only headset retention but also charging from wireless host device 201.

Referring again to FIGS. 1-6, inner distance 112 depicts the distance between the inner surface of the ear-bud portion 502 and the inner surface of the body portion 501 at the top of the ear-bud portion, where the "top" of the ear-bud portion 102 is the end of the ear-bud portion 102 that is coupled with the neck portion 103. In at least one embodiment, this inner distance 112 is equal to or greater than the width of the wireless host device 201. Clipping distance 113 depicts the distance between the inner surface of the ear-bud portion 502 and the inner surface of the body portion 501 at the bottom of the ear bud portion, where the "bottom" of the ear-bud portion 102 is the end of the ear-bud portion 102 that is not coupled with the neck portion 103. In at least one embodiment, when the wireless headset device 100 is in its original default shape (meaning the device has no forces acting on it), the clipping distance 113 is equal to or less than the inner distance 112. In certain embodiments, the clipping distance 113 is less than the width of the wireless host device 201. Outward flexing of the ear-bud portion 102 and the body portion 101 increase the clipping distance 113 to allow the wireless headset device 100 to be clipped onto the wireless host device 201.

As further illustrated in FIG. 1, at least one embodiment of the wireless headset device 100 includes a clipping spring 110 coupled with the neck portion 103 and at least one of the body portion 101 and the ear-bud portion 102. The clipping spring 110 has a spring tension that resists an increase to the clipping distance 113 by outward flexing. In another embodiment, the neck portion 103 and the body portion 101 form at least one joint 111 at the connection point. A joint, in general, can be any moveable, flexible, or deformable component interfacing between other components that allows those components to move with respect to one another. This joint can include springs, hinges, bearings, et cetera. The joint can also be constructed of rubber, plastic, or any other material that is flexible, stretchable, compressible, et cetera. The parts that the joint links can be either rigid or flexible themselves. The joint 111 allows the neck portion 103 to be inwardly mobile towards the body portion 101. In certain embodiments, the joint 111 is formed at the connection point between the ear-bud portion 102 and the neck portion 103. In other embodiments, the joint 111 is vertically oriented and located wholly on the neck portion 103.

In another embodiment of the wireless headset device 100, the neck portion 103 is at least partially flexible. With the neck portion 103 at least partially flexible, the body portion 101 and the ear-bud portion 102 are outwardly flexible. "Outward" refers to a direction that is away from the opposing housing portion member. For example, an outward movement of the ear-bud portion 102 would be a movement in the direction away from the body portion 101. Further, an outward movement of the body portion 101 would be a movement in the direction away from the ear-bud portion 102. Alternately, "inward" refers to a direction that is towards the opposing housing portion member. "Outward" flexing increases the clipping distance 113 while "inward" flexing decreases the clipping distance 113. The body portion 101 and the ear-bud portion 102 being outwardly flexible allows for a temporary increase in clipping distance 113 and allows the wireless headset device 100 to be positioned and clipped onto the host device 201. In addition to the neck portion 103 being at least partially flexible, the body portion 101 and the ear-bud portion 102 may be at least partially flexible as well.

As previously mentioned, the body portion components 105, ear-bud portion components 106, and neck portion components 107 can include the wireless communication component 600, a printed circuit board ("PCB"), a battery, an indicator light, or a multifunction button. In order to accommodate the shape and form factor of the housing, one or both of the PCB and the battery may be curved, constructed from flexible material, or both.

Figure 2:
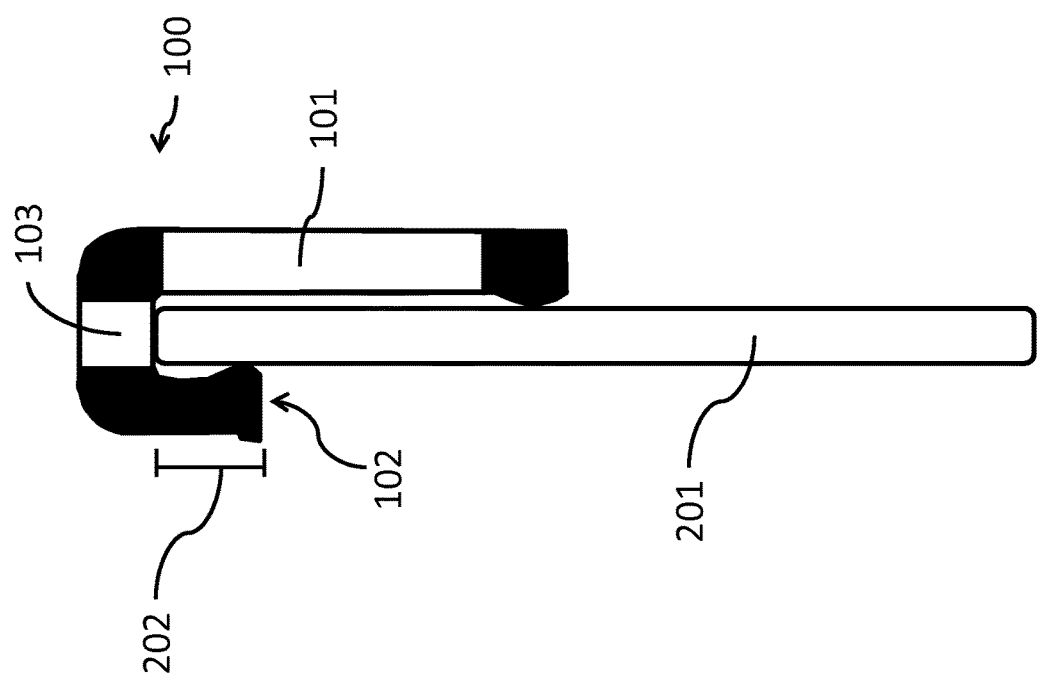
FIG. 2 illustrates a perspective side angle view of an embodiment of the wireless headset device attached to a wireless host device.
Figure 3:
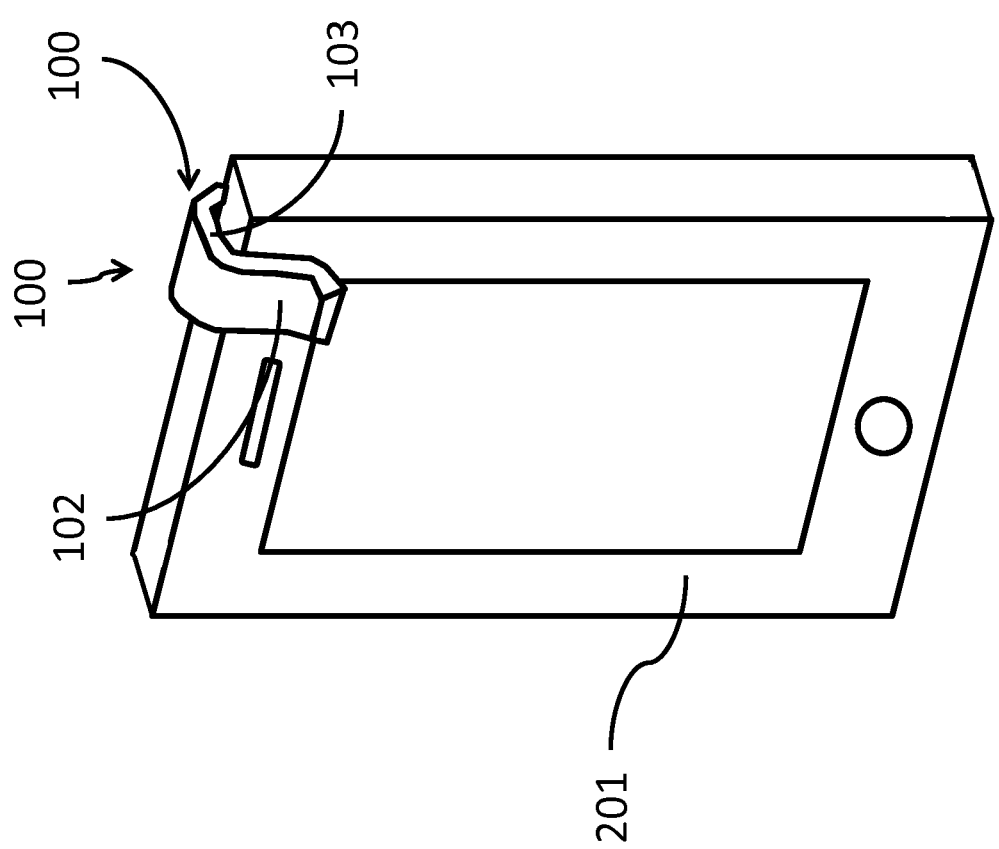
FIG. 3 illustrates a perspective front angle view of a second embodiment of the wireless headset device attached to a wireless host device.

As illustrated in FIGS. 2-5, the housing of the wireless headset device 100 is attachable on the wireless host device 201 between an inner surface of the ear-bud portion 502 and an inner surface of the body portion 501. The wireless host device 201 can make contact with the entire surface area of the inner surface of the ear-bud portion 502 or the wireless host device 201 can make contact with a portion of the surface area of the inner surface of the ear-bud portion 502. Similarly, the wireless host device 201 can make contact with the entire surface area of the inner surface of the body portion 501 or the wireless host device 201 can make contact with a portion of the surface area of the inner surface of the body portion 501. As seen in FIG. 2, the distance between the ear-bud portion 102 and the body portion 101 can vary over the length 202 of the ear-bud portion.

Figure 4:
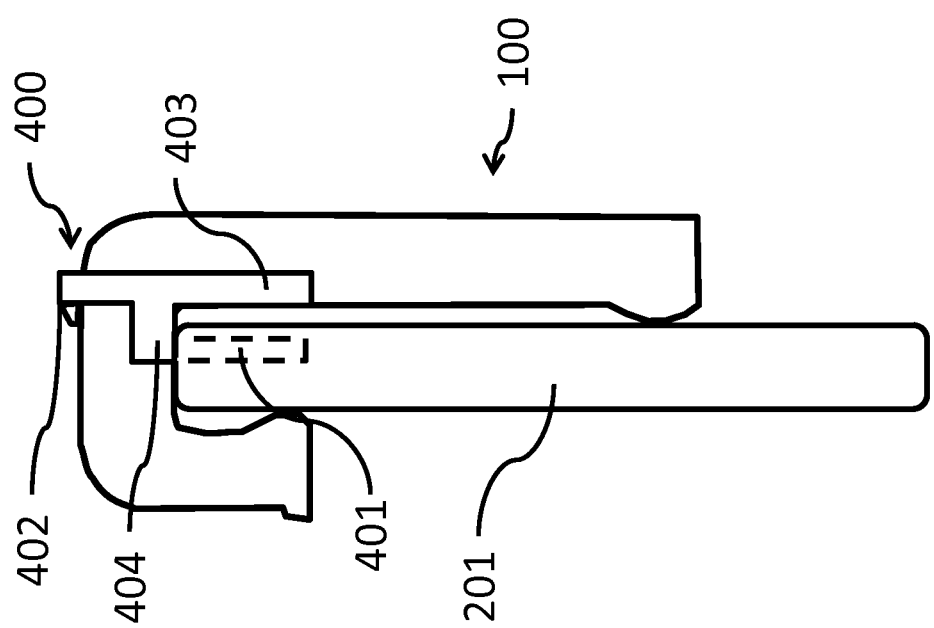
FIG. 4 illustrates a perspective side angle view of an embodiment of the wireless headset device attached to a wireless host device, further secured by a clip.

As illustrated in FIG. 4, a clip 400 can be used to removeably secure the wireless headset 100 housing to the wireless host device 201. The clip 400 includes a plug 401 configured to mate with a port on the wireless host device 201. This port can be any type of connection such as an audio port, charging port, USB port, among others. The clip 400 has a holding arm 402 to hold the headset 100 in place when the clip 400 is attached to the wireless host device 201. There are two stabilizing side arms 403. A cross beam 404 connects the stabilizing side arms 403, the holding arm 402, and the plug 401. In alternative or complementary embodiments clip 400 can match the geometry or contour of a device without coupling through a port. The user can remove the clip 400 from the wireless host device 201 anytime as desired.

Figure 5B:
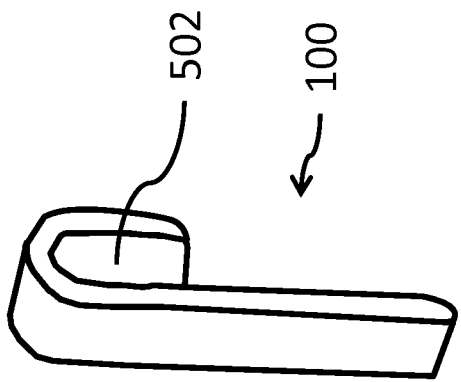
FIGS. 5a and 5b illustrate a perspective view of an embodiment of the wireless headset. Displayed are the inner surfaces of the ear-bud portion of the housing and the body portion of the housing.
Figure 5A:
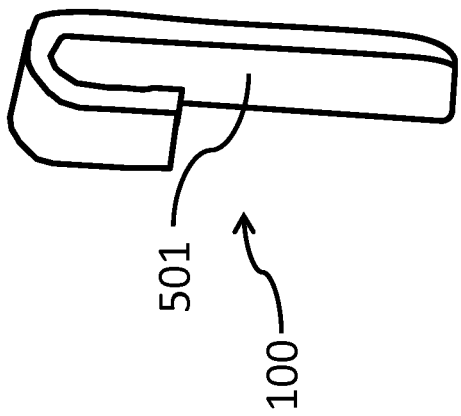

As illustrated in FIG. 5a and FIG. 5b, the wireless headset device 100 has an inner surface of the body portion 501 and an inner surface of the ear-bud portion 502. These surfaces can be constructed of or coated with materials including flexible or compressible materials. The inner surfaces of the body portion 501 and the ear-bud portion 502 can be constructed or coated with a single material or portions of the surface areas can consist of multiple different materials. In at least one embodiment, construction of these inner surfaces is from a soft elastomeric or rubberized material causing an increased friction with the wireless host device 201 surface.

As illustrated in FIG. 6, the wireless communications component 600 is configured to communicate wirelessly with the wireless host device 201. The wireless communication can be accomplished via any wireless communication protocol such as Bluetooth, WiFi, Zigbee, et cetera. The wireless communications component 600 can be wirelessly paired with at least the wireless host device 201. Additionally, the wireless communications component 600 can be paired with the wireless host device 201 and at least a second host device 601. For example, the wireless host device 201 can be a wireless smartphone and a second host device 601 can be a laptop computer. The user can, for example, use the wireless headset device 100 to listen to music or other audio sourced from a laptop computer (second host device 601), but also seamlessly receive and answer phone calls sourced from the user's cell phone (wireless host device 201). For purposes of clarity, wireless host device 201, second host device 601, and others need not be exclusively wireless themselves, but only communicate wirelessly to interact with wireless headset device 100. In this manner, wireless headset device 100 may interact with, e.g., a desktop computer.

In an embodiment, the wireless headset system includes a housing having at least a wireless communication component 600 configured to communicate with a wireless host device 201. The housing includes: a body portion 101, an ear-bud portion 102 having at least a speaker 104 operatively coupled with the wireless communications component 600, and a neck portion 103 having an ear-bud end and a body end, the ear-bud end coupled with the ear-bud portion 102, the body end coupled with the body portion 101, the neck portion 103 separating the ear-bud portion 102 and the body portion 101 by a distance. The housing is attachable on the wireless host device 201 between an inner surface of the ear-bud portion 502 and an inner surface of the body portion 501, and where the body portion 101 and the ear-bud portion 102 are positionable to vary the distance between the body portion 101 and the ear-bud portion 102. The distance between the ear-bud portion 102 and the body portion 101 varies over a length 202 of the ear-bud portion 102 wherein the body portion 101 and the ear-bud portion 102 are separated by an inner distance 112 at a top of the ear-bud portion 102. The inner distance 112 is equal to or greater than a thickness of the wireless host device 201. The ear-bud portion 102 is separated from the body portion 101 by a clipping distance 113 at the bottom of the ear-bud portion 102. At least one of the ear-bud portion 102 and the body portion 101 are outwardly flexible to vary the clipping distance 113 based at least in part on the neck portion 103 being at least partially flexible. In another embodiment, at least one of the ear-bud portion 102 and the body portion 101 is constructed in part of a compressible material, the compressible material compressing or expanding to increase or decrease the clipping distance 113. In another embodiment, the neck portion 103 is curved.

In another embodiment, the wireless headset 100 comprises a clipping spring 110 coupled with the neck portion 103 and at least one of the body portion 101 and the ear-bud portion 102. The clipping spring 110 has a spring tension resisting increase to the clipping distance 113 by outward flexing. In another embodiment, the body portion 101 comprises a microphone component 108 operatively coupled with the wireless communications component 600. In another embodiment, the body portion 101 comprises at least one of a display and a camera. Yet another embodiment includes a clip 400 which includes a plug 401 configured to mate with a wireless host device 201 port. The clip 400 is configured to removeably secure the wireless headset 100 housing to the wireless host device 201.

In certain embodiments, the wireless headset system comprises a battery in the housing. The body portion 101 terminates with an electronic connector 109 coupled with the battery. The electronic connector 109 can be a USB connector. In other embodiments, the wireless headset system includes a flexible printed circuit board in the housing. In another embodiment, at least one of the ear-bud portion 102 and the body portion 101 is constructed at least in part of a flexible material, the flexible material inwardly flexible to vary at least the clipping distance 113.

In another embodiment, the body end of the neck portion 103 coupled with the body portion 101 forms a joint 111. This joint 111 can be constructed at least in part of a stretchable material. The body portion 101 and the ear-bud portion 102 can be outwardly flexible to vary the clipping distance 113 based at least in part on the neck portion 103 being at least partially moveable about the joint 111. The wireless headset device 100 can have a clipping spring 110 coupled with the neck portion 103 and at least one of the body portion 101 and the ear-bud portion 102, the clipping spring 110 having a spring tension resisting outward movement about the joint 111 to increase the clipping distance 113.

In certain embodiments of the wireless headset system, the wireless communications component 600 can communicate with the wireless host device 201 using Bluetooth communications. The wireless communications component 600 can be paired to the wireless host device 201 and at least a second host device 601.

In the appended claims, the terms "including" and "having" are used as the plain language equivalents of the term "comprising"; the term "in which" is equivalent to "wherein." Further, the limitations of the following claims are not written in means-plus-function format and are not intended to be interpreted based on 35 U.S.C. §112, sixth paragraph. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description may use examples to disclose the invention and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope or spirit of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A wireless headset system for a wireless host device comprising:
    a housing having at least a wireless communications component configured to communicate with a wireless host device, the housing including:
        a body portion;
        an ear-bud portion having at least a speaker operatively coupled with the wireless communications component; and
        a neck portion having an ear-bud end and a body end, the ear-bud end coupled with the ear-bud portion, the body end coupled with the body portion, the neck portion separating the ear-bud portion and the body portion by a distance;
    where the body portion and ear-bud portion resist an outward flexing that increases a clipping distance between the body portion and the ear-bud portion;
    where the housing is attachable on the wireless host device between an inner surface of the ear-bud portion and an inner surface of the body portion and generally held in position by the resistance to the outward flexing; and
    where the body portion and the ear-bud portion are positionable to vary the distance between the body portion and the ear-bud portion.

2. The wireless headset system of claim 1, wherein the distance varies over a length of the ear-bud portion, wherein the body portion and the ear-bud portion are separated by an inner distance at a top of the ear-bud portion, the inner distance being equal to or greater than a thickness of the wireless host device, the ear-bud portion separated from the body portion by the clipping distance at the bottom of the ear-bud portion.

3. The wireless headset system of claim 1 wherein at least one of the ear-bud portion and the body portion are outwardly flexible to vary the clipping distance based at least in part on the neck portion being at least partially flexible.

4. The wireless headset system of claim 2 wherein at least one of the ear-bud portion and the body portion is constructed at least in part of a compressible material, the compressible material compressing or expanding to increase or decrease the clipping distance.

5. The wireless headset system of claim 1, further comprising a clipping spring coupled with the neck portion and at least one of the body portion and the ear-bud portion, the clipping spring having a spring tension resisting increase to the clipping distance by outward flexing.

6. The wireless headset system of claim 1 wherein the body portion comprises a microphone component operatively coupled with the wireless communications component.

7. The wireless headset system of claim 1 further comprising a clip which includes a plug configured to mate with a host device port, the clip is configured to removeably secure the wireless headset housing to the wireless host device.

8. The wireless headset system of claim 1 wherein the neck portion is curved and is flexible relative to at least one of the ear-bud portion and the body portion.

9. The wireless headset system of claim 1 further comprising a battery in the housing.

10. The wireless headset system of claim 9 wherein the body portion terminates opposite the neck with an electronic connector coupled with the battery.

11. The wireless headset system of claim 10 wherein the electronic connector is a USB connector.

12. The wireless headset system of claim 1 wherein the body portion comprises at least one of a display and a camera.

13. The wireless headset system of claim 1 further comprising a flexible printed circuit board in the housing.

14. The wireless headset system of claim 1 wherein at least one of the ear-bud portion and the body portion is constructed at least in part of a flexible material, the flexible material inwardly flexible to vary at least the clipping distance.

15. The wireless headset system of claim 1 wherein the body end of the neck portion coupled with the body portion forms a joint.

16. The wireless headset system of claim 15 wherein the joint is constructed at least in part of a stretchable material.

17. The wireless headset system of claim 15 wherein the body portion and the ear-bud portion are outwardly flexible to vary the clipping distance based at least in part on the neck portion being at least partially moveable relative to the body portion about the joint.

18. The wireless headset system of claim 17 further comprising a clipping spring coupled with the neck portion and at least one of the body portion and the ear-bud portion, the clipping spring having a spring tension resisting outward movement about the joint to increase the clipping distance.

19. The wireless headset system of claim 1 wherein the wireless communications component communicates with the wireless host device using Bluetooth communications.

20. The wireless headset system of claim 9 wherein the wireless communications component can be paired to the wireless host device and at least a second host device.

* * * * *